Patented Apr. 23, 1929.

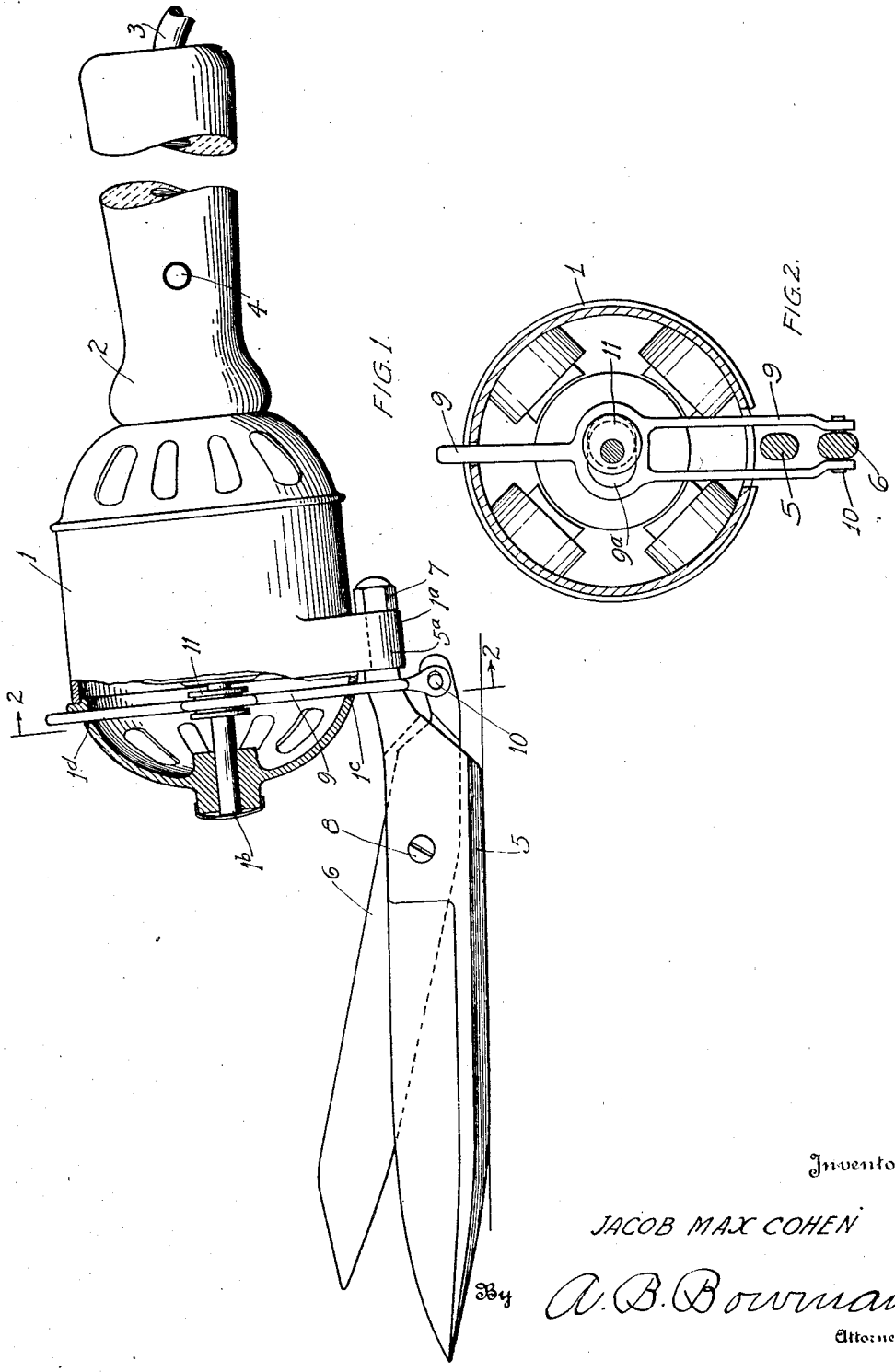

1,710,347

UNITED STATES PATENT OFFICE.

JACOB MAX COHEN, OF SAN DIEGO, CALIFORNIA.

AUTOMATIC SHEARS.

Application filed March 11, 1924. Serial No. 698,390.

My invention relates to a portable, automatic electric shears for cutting fabrics and the like, and the objects of my invention are: first, to provide a shears of this class which is particularly adapted for cutting fabrics to order or in quantity for making clothing and the like; second, to provide a shears of this class which is also particularly adapted for cutting fabrics of fine and thin texture, such as silk, crêpe de chines, georgettes, laces and the like; third, to provide an electric shears which will greatly facilitate and expedite the work of cutting materials either in straight or curved lines; fourth, to provide a shears of this class which is very light of construction and which may be easily manipulated and guided by hand; fifth, to provide a shears of this class in which the shearing mechanism is supported by the motor and operated by its rotor; sixth, to provide such a shears in which one of the shearing blades is adapted to rest on the cutting table and in which the other blade is pivotally mounted relatively thereto and reciprocated about its pivotal mounting by the motor; seventh, to provide such a shears in which the movable cutting blade will not interfere with the cutting table; eighth, to provide a shears of this class in which the movable cutting blade is connected with the rotating shaft of the motor by means of an eccentric and a reciprocating connecting rod; ninth, to provide a shears of this class which may be easily held and controlled with one hand; tenth to provide a shearing mechanism which may be readily applied to machines for cutting fabrics of single or a few thicknesses; eleventh, to provide a novelly constructed shears of this class, and twelfth, to provide such a shears which is very simple and economical of construction, durable, efficient, practical, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my shears showing the motor partly broken away and in section to facilitate the illustration and showing the handle for supporting the motor fragmentarily, and Fig. 2 is a sectional elevational view thereof with the section taken through 2—2 of Fig. 1, showing the mechanism for driving one of the shearing blades.

Like characters of reference refer to similar parts and portions throughout the several views of the drawings.

The motor 1, handle member 2, electric cable 3, switch button 4, shearing members 5 and 6, nut 7, screw 8, connecting rod 9, pin 10, and the eccentric member 11, constitute the principal parts and portions of my electric shears.

The motor 1 for operating my shearing mechanism and to which the same is secured is of any suitable light construction and is provided with a handle member 2 for supporting and guiding the same. The handle member preferably extends outwardly from the back end of the motor and is positioned in axial alinement therewith. Said handle member is of such a length as to provide a good grip for the hand and is made hollow to receive the electric cable 3 for supplying electrical energy to the motor 1, there being provided a pair of switch buttons 4 on opposite sides of the handle member for connecting and disconnecting the motor with and from a source of electrical energy.

At the lower side of the motor housing 1 is provided a downwardly extending lug 1ª through which extends the reduced shank 5ª at the rear end of the shearing member 5, said shearing member being secured in position to said lug by means of a nut 7 secured at the end of said shank. The blade portion of the shearing member 5 is constructed similarly to that of the conventional hand shears, the shank for supporting the same being off-set a considerable distance from the back side of the blade portion thereof, as shown best in Fig. 1. On the flat side and intermediate the ends of the shearing member 5 is pivotally mounted another shearing member 6, which is somewhat shorter, narrower and lighter than the member 5. The blade portion of the shearing member 5 is longer than the member 6 in order to retain the material to be cut at all times on the former. Said shearing members 5 and 6 are pivotally connected together intermediate their ends by means of a screw 8. The backwardly extending end of the cutting member 6 is pivotally connected by means of a pin 10 with the lower end of the bifurcated portion of the connecting rod 9, which is reciprocally mounted in the end of the motor housing opposite the handle member 2 and extends transversely through the opposite sides of said housing at 1ᶜ and 1ᵈ. On the motor shaft 1ᵇ is secured an eccentric member 11, which is provided with annular flanges at the sides thereof between which is positioned the enlarged portion intermediate the ends of the connecting rod, there being provided a laterally elongated slot 9ᵃ in the enlarged portion of said connecting rod through which the eccentric member extends and which permits the eccentric member 11 to be rotated with the shaft of the motor for reciprocating the connecting rod.

Thus it will be seen from the structure, as illustrated in the drawings and disclosed in the foregoing specification, that there is provided an automatically operated shears which is readily portable, which has the distinct advantages and performs the functions as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a portable shearing mechanism, a pair of long shearing members pivotally connected intermediate their ends, an electric motor provided with an extended lug on the casing with a hole therein in which the backwardly extending end of one of said shearing members is rigidly supported, a connecting rod pivotally connected with the extended portion of the other shearing member reciprocally mounted through both sides of the motor casing and encircling the motor shaft intermediate its ends, and an eccentric mounted on the motor shaft and operatively connecting said shaft with said connecting rod.

2. In a portable shearing mechanism, a pair of long shearing members pivotally connected intermediate their ends at their middle portions, an electric motor provided with an extended lug on the casing with a hole therein in which the backwardly extending end of one of said shearing members is rigidly supported, a connecting rod pivotally connected with the extended portion of the other shearing member reciprocally mounted in the motor casing and extending through both sides of said casing and guided at one end by said casing and its opposite end straddling said rigidly supported shearing member, and an eccentric mounted on said motor shaft and operatively connecting said shaft with said connecting rod.

In testimony whereof, I have hereunto set my hand at San Diego, California, this 6th day of March, 1924.

JACOB MAX COHEN.